2,824,089

HYDROCARBON CONVERSION (GROUP 6a METAL OXIDE AND AlR$_3$ INITIATOR)

Edwin F. Peters, Lansing, and Bernard L. Evering, Chicago, Ill., assignors to Standard Oil Company, Chicago, Ill., a corporation of Indiana No Drawing. Application April 28, 1955
Serial No. 504,684

14 Claims. (Cl. 260—88.1)

This invention relates to a process for the preparation of high polymers, being usually normally solid materials, from charging stocks comprising essentially normally gaseous mono-olefins in the presence of novel catalysts comprising essentially supported oxide of a metal of group 6a of the periodic table and certain compounds of aluminum.

One object of our invention is to provide novel combinations of catalysts for the conversion of normally gaseous mono-olefins to high molecular weight polymers, especially normally solid polymers. Another object is to provide a low temperature, low pressure process for the conversion of ethylene-containing gases to high molecular weight, resinous materials characterized by high density and crystallinity. Still another object is to provide a novel catalytic process for the conversion of propylene-containing gases to normally solid polymers, especially relatively crystalline modifications of solid polypropylenes. Yet another object is to provide processes for the co-polymerization of ethylene and/or propylene-containing mixtures with various co-monomers to produce resinous products. An additional object is to provide new polymerization catalysts to effect the above and other objects which will become apparent from the ensuing description of our invention.

Briefly, the inventive process comprises the conversion of a normally gaseous mono-olefin to high molecular weight, normally solid polymers by contact with a catalyst comprising supported oxide of group 6a of the periodic table and, as co-catalyst, an aluminum compound conforming to the general formula AlR$_3$, wherein R is selected from the group consisting of hydrogen and monovalent hydrocarbon radicals. The polymerization or co-polymerization process can be effected at suitable temperatures within the range of about 50 to about 230° C. and pressures ranging upwardly from atmospheric to any desired maximum pressure, for example, 15,000, 30,000 p. s. i. g. or even higher pressures, suitably pressures between about 200 and about 5000 p. s. i. g. or about 500 to 1000 p. s. i. g.

The proportion of group 6a metal oxide catalyst (including the catalyst support), with respect to the olefin charging stock, may vary from about 0.001 to about 20 weight percent, being not usually a critical feature of our process. The proportion of AlR$_3$ compound, based on the olefinic charging stock, can be varied within the range of about 0.001 to about 10 weight percent, the precise proportion selected for use being dependent upon the desired rate of polymerization, which increases with increasing concentration of AlR$_3$ in the reaction mixture, the concentration of contaminants in the olefinic feed stock which tends to react with or destroy the AlR$_3$, the particular olefin charging stock, temperature and other reaction variables.

It is desirable to supply to the reaction zone a liquid medium which serves both as a transport medium for solid products and as a solvent for the olefin feed stock and AlR$_3$ co-catalyst. Suitable liquid reaction media for polymerization include various hydrocarbons, e. g., liquid paraffins such as n-heptane or octanes or aromatic hydrocarbons such as benzene, toluene or xylenes. The polymerization can be effected in the absence of a liquid reaction medium or solvent and solid catalyst containing accumulated solid polymers can be treated from time to time, within or outside the conversion zone, to effect removal of polymers therefrom and, if necessary, reactivation or regeneration of the catalyst for further use.

In what follows, the invention will be described in greater detail and illustrated by working examples.

The charging stock to the present polymerization process comprises essentially a normally gaseous mono-olefinic hydrocarbon, mixtures of such hydrocarbons, and mixtures comprising said hydrocarbons and co-monomers. The normally gaseous mono-olefins comprise ethylene, propylene and the butylenes. Co-monomers comprise polymerizable materials such as t-butylethylene, conjugated diolefinic hydrocarbons such as butadiene, isoprene, and the like; styrene, Ar-alkyl styrenes; various vinyl compounds such as tetrafluoroethylene, perfluoro vinyl chloride and the like. When co-monomers are employed with the principal charging stock, their proportion may range between about 1 and about 25% by weight, based on the weight of the principal olefin charging stock, such as ethylene.

The oxide catalyst ingredients employed in the present invention are derivatives of metals of group 6a (transition series members) of the periodic table, viz. Cr, Mo, W and U. The group 6a oxides are extended upon suitable supports and are, preferably, at least partially prereduced to sub-hexavalent metal oxides before use and preferably before contact with the AlR$_3$ co-catalyst. Mixed oxides or complex oxygen compounds of group 6a metals can also be employed in the present process. Thus, in addition to the group 6a metal oxide, the catalysts may comprise oxides of copper, tin, zinc, nickel, cobalt, titanium, zirconium, etc. Mixed metal oxide catalysts can readily be made by calcining the desired metal salts of oxy acids of group 6a metals, wherein the group 6a metal appears in the anion, for example, salts of molybdic acid and the like.

The group 6a metal oxide can be extended upon suitable supports (having surface areas, for example, between 1 and about 1500 square meters per gram), for example, activated carbon; the difficultly reducible metal oxides such as alumina, magnesia, titania, zirconia, silica or their composites, e. g., synthetic aluminosilicates, clays and the like. In some instances it may be desired to employ a relatively low surface area support, of which a variety are known in the art, including tabular alumina, various fused silicates, silicon carbide, diatomaceous earths; various metals, preferably treated to produce a relatively thin surface coating of the corresponding metal oxide thereon, such as iron or steel containing a slight iron oxide coating or aluminum carrying a surface coating of aluminum oxide, e. g., as an anodized aluminum. We may also employ relatively high surface area, relatively non-porous supports or carriers for the group 6a metal oxide such as kaolin, zirconium oxide, iron oxide pigments, carbon black or the like.

The catalyst support may comprise or consist essentially of suitable metal fluorides, particularly the fluorides of alkali metals, alkaline earth metals, Al, Ga and In. High melting fluorides which are only slightly soluble, at most, in water are preferred. A particularly desirable type of catalyst support comprises or consists essentially of AlF$_3$. The group 6a metal oxide can be coprecipitated with or impregnated on a gelatinous slurry of hydrated AlF$_3$ and the composite catalyst can then be calcined prior to use.

The relative proportion of support to the catalytic metal oxide is not critical and may be varied throughout a relatively wide range such that each component is present in amounts of at least approximately 1 weight percent. The usual metal oxide: support ratios are in the range of about 1:20 to 1:1, or approximately 1:10. We may employ metal oxide catalysts composed of a supporting material containing about 1 to 80%, preferably about 5 to 35%, or approximately 10%, of molybdena or other group 6a catalytic metal oxide supported thereon.

The group 6a metal oxide can be incorporated in the catalyst support in any known manner, for example, by impregnation, coprecipitation, co-gelling and/or absorption techniques which are well known in the catalyst art. It may be desired to confine the group 6a metal oxide almost completely to a surface film on the support, rather than to achieve deep impregnation of the support with 6a oxide catalyst, in order to minimize mechanical disintegration of the catalyst by solid polymer.

In order to maximize the catalyst activity and reduce the requirements of the $AlR_3$ co-catalysts, it is preferable to effect partial reduction of catalysts comprising hexavalent group 6a metal oxides before use in the polymerization process. The partial reduction and conditioning treatment of the solid metal oxide catalysts is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc. may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation can be varied from subatmospheric pressures, for example even 0.1 pound (absolute), to relatively high pressures up to 30 p. s. i. g., or even more. The simplest reducing operation can be effected with hydrogen at about atmospheric pressure.

Reducing gases such as carbon monoxide and sulfur dioxide may be used under substantially the same conditions as hydrogen. Dehydrogenatable hydrocarbons are usually employed at temperatures of at least about 450° C. and not above 850° C. Examples of dehydrogenatable hydrocarbons are acetylene, methane and other normally gaseous paraffin hydrocarbons, normally liquid saturated hydrocarbons, aromatic hydrocarbons such as benzene, toluene, xylenes and the like, normally solid polymethylenes, polyethylenes or paraffin waxes, and the like.

The proportion of group 6a metal oxide catalyst (including support), based on the weight of the mono-olefinic charging stock, can range upwardly from about 0.001 weight percent to 20 weight percent or even more. In a polymerization operation carried out with a fixed bed of catalyst, the catalyst concentration relative to olefin can be very much higher. The efficiency of the supported group 6a metal oxide catalysts is extremely high in the presence of $AlR_3$ co-catalysts, so that said metal oxide catalysts can be employed in very small proportions, based on the weight of charging stock, for example, between about 0.01 and about 10 weight percent, while maintaining high conversion efficiency.

The $AlR_3$ compounds which can be used in practicing our invention include compounds conforming to the general formula:

wherein $R_1$, $R_2$ and $R_3$ may be the same or different monovalent radicals selected from the class consisting of hydrogen and monovalent hydrocarbon radicals. Examples of suitable R groups include an aryl radical, aliphatic hydrocarbon radical or derivative, such as alkyl, cycloalkyl-alkyl, cycloalkenyl-alkyl, aryl-alkyl, cycloalkyl, alkyl-cycloalkyl, aryl-cycloalkyl, cycloalkyl alkenyl, alkyl-aryl or cycloalkyl-aryl radicals.

Specific examples of R groups for substitution in the above formula include methyl, ethyl, n-propyl, isopropyl, isobutyl, n-amyl, isoamyl, hexyl, n-octyl, n-dodecyl, and the like; 2-butenyl, 2-methyl-2-butenyl and the like; cyclopentyl-methyl, cyclohexyl-ethyl, cyclopentyl-ethyl, methylcyclopentyl-ethyl, 4-cyclohexenylethyl and the like; 2-phenylethyl, 2-phenylpropyl, α-naphthylethyl, methylnaphthylethyl, and the like; cyclophentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl and the like; phenylcyclopentyl, phenylcyclohexyl, the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, cyclohexylphenyl and other $AlR_3$ compounds of the type disclosed and suggested in German Patent 878,560.

The proportion of $AlR_3$ co-catalyst, based on the weight of the olefinic charging stock, can range from about 0.001 to 20 weight percent or even more, although it is usually employed in proportions between about 0.001 and about 10 weight percent, e. g., usually about 0.01 to about 5 weight percent.

The olefinic charging stock can be polymerized in the gas phase, but it is highly desirable to effect polymerization in the presence of a substantially inert liquid reaction medium which functions as a partial solvent for the monomer, which may function as a solvent for the $AlR_3$ co-catalyst and which also functions as a liquid transport medium to remove normally solid polymerization products as a dispersion in said medium from the polymerization reactor, thus permitting efficient and continuous polymerization operations.

Particularly suitable liquid reaction media are various classes of hydrocarbons or their mixtures which are liquid and substantially inert under the polymerization conditions of the present process. Certain classes of aliphatic hydrocarbons can be employed as a liquid hydrocarbon reaction medium in the present process. Thus we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as propane, butanes, n-pentane, n-hexane, 2,3-dimethylbutane, n-octane, isooctane (2,2,4-trimethylpentane), n-decane, n-dodecane, cyclohexane, methylcyclohexane, dimethylcyclopentane, ethylcyclohexane, decalin, methyldecalins, dimethyldecalins and the like.

Members of the aromatic hydrocarbon series, particularly the mononuclear aromatic hydrocarbons, viz., benzene, toluene, xylenes, mesitylene and xylene-p-cymene mixtures can also be employed. Tetrahydronaphthalene can also be employed. In addition, we may employ such aromatic hydrocarbons as ethylbenzene, isopropylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

We may also employ a liquid hydrocarbon reaction medium comprising liquid olefins, e. g., n-hexenes, cyclohexene, octenes, hexadecenes and the like.

The liquid hydrocarbon reaction medium should be freed of poisons before use in the present invention by acid treatment, e. g. with anhydrous p-toluenesulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

Temperature control during the course of the polymerization process can be readily accomplished owing to the presence in the reaction zone of a large liquid mass having relatively high heat capacity. The liquid hydrocarbon reaction medium can be cooled by heat exchange inside or outside the reaction zone.

It is desirable to minimize or avoid the introduction of water, oxygen, carbon dioxide, acetylene or sulfur compounds into contact with the catalyst or co-catalyst. Any known means may be employed to purify the olefinic charging stocks of these materials prior to their introduction into the polymerization reactor.

The contact time or space velocity employed in the polymerization process will be selected with reference to the other process variables, catalysts, the specific type of product desired and the extent of olefin conversion desired in any given run or pass over the catalyst. In general, this variable is readily adjustable to obtain the desired results. In operations in which the olefin charging stock is caused to flow continuously into and out of contact with the solid catalyst, suitable liquid hourly space velocities are usually between about 0.1 and about 10 volumes, preferably about 0.5 to 5 or about 2 volumes of olefin solution in a liquid reaction medium. The amount of olefin in such solutions may be in the range of about 2 to 50% by weight, preferably about 2 to about 15 weight percent or, for example, about 5 to 10 weight percent.

The following specific examples are introduced as illustrations of our invention and should not be interpreted as an undue limitation thereof. The ethylene employed in the polymerization reactions was a commercial product containing oxygen in the range of about 15 to 50 p. p. m. The benzene employed in some of the examples was a commercial product of analytical grade, free of thiophene, dried before use by contact with sodium hydride. The aluminum trimethyl promoter was prepared by the reaction of aluminum with methyl iodide (J. A. C. S. 68, 2204 (1946)) and was vacuum fractionated at 100/1 reflux ratio before use (boiling range 65–7° C. under 84 mm. of Hg.). The aluminum triethyl was prepared by the reaction of diethyl mercury with aluminum. Prior to use in polymerization the group 6a catalysts were calcined at temperatures within the range of about 430 to 570° C. at atmospheric pressure for substantial periods within the range of about 12 to about 20 hours.

Example 1

The 300 cc. steel autoclave was charged with 19 g. of calcined 8.5 wt. percent $MoO_3$-activated alumina catalyst, 105 g. of benzene and 3.4 g. of triethyl aluminum, which was charged under the surface of the benzene. A total of 77 g. of ethylene was charged to the autoclave. The contents of the autoclave were agitated and heated in one hour from room temperature to 121° C., then maintained at 121° C. for 3 hours. The initial pressure at room temperature was 600 p. s. i. and the maximum pressure was 1000 p. s. i. The reaction products were analyzed and it was found that 67 g. of ethylene had been converted to an extremely high molecular weight polymer which was essentially insoluble in boiling xylenes. This polymer was found to have a density (24/4° C.) of 0.9629, a melt viscosity at 145° C. of $7.6 \times 10^7$ poises and was a tough, flexible material. It was further found that none of the ethylene had been converted to normally gaseous or normally liquid products.

When the molybdena catalyst was used without a support, markedly inferior polymerization was obtained as will be observed from the following data. The autoclave was charged with 13 g. of calcined $MoO_3$, 93 g. of n-heptane, 0.65 g. of trimethyl aluminum and 32 g. of ethylene. The contents of the reactor were agitated and brought from room temperature to 240° C. over a period of 3 hours and then held at 240° C. for 2 hours. The initial pressure was 300 p. s. i. and rose to a maximum of 1100 p. s. i. The products were worked up and it was found that 18 g. of liquid polymers had been formed but only 0.4 g. (1.25 wt. percent based on ethylene charged) of a normally solid polymer. A very similar yield of solid polymer (0.5 g.) was obtained when xylenes solvent was substituted for n-heptane, the other reaction conditions being similar.

When triethyl aluminum alone was used as the catalyst, ethylene was not converted to a solid polymer as will appear from the following data. The reactor was charged with 105 g. of benzene, in which 2.6 g. of triethyl aluminum were dissolved. Then 50 g. of ethylene were introduced into the reactor and the contents were agitated while heating from room temperature to 171° C. The initial pressure was 600 p. s. i. and the maximum was 2000 p. s. i. The reaction period was 4 hours. The contents of the reactor were analyzed and it was found that 4 g. of liquid products had been produced but no gaseous or solid polymerization products were produced. Under similar operating conditions it was found that ethylene was likewise not converted to solid polymerization products by treatment in the presence of trimethyl aluminum.

Example 2

The autoclave was charged with 20 g. of 20 wt. percent $Cr_2O_3$-activated alumina catalyst, 105 g. of benzene and 3.2 g. of triethyl aluminum. The reactor was then pressured with 72 g. of ethylene and the contents were heated with agitation from room temperature to 121° C. for 3 hours. The initial pressure was 600 p. s. i. and the maximum was 1000 p. s. i. The reaction products were worked up and it was found that 61 g. of a tough, solid, extremely high molecular weight polyethylene was produced which was essentially insoluble in boiling xylenes. This polyethylene was found to have a density (24/4° C.) of 0.9634, a melt viscosity at 145° C. of $4.2 \times 10^6$ poises and was a tough, flexible material. None of the ethylene was converted to gaseous or liquid products.

Relatively inferior results were obtained in ethylene polymerization with unsupported $Cr_2O_3$ catalyst as will be seen from the following data. The autoclave was charged with 10 g. of calcined C. P. $Cr_2O_3$, 81 g. of n-heptane, 0.63 g. of aluminum trimethyl and 34 g. of ethylene. The contents of the reactor were heated with agitation to 104° C. over a reaction period of 3 hours. The initial pressure was 400 p. s. i. and the maximum was 1000 p. s. i. The ethylene was converted to 12 g. of a solid polymer.

Example 3

This example relates to the polymerization of propylene to an extremely high molecular weight solid polymer. The reactor was a 300 cc. steel rocking bomb. It was charged with 44 g. of 20–35 mesh cobalt molybdate-alumina catalyst. The composition of the catalyst was 3 wt. percent CoO, 9 wt. percent $MoO_3$ and the remainder activated alumina, before the reducing treatment. The catalyst was calcined at 455° C. under a pressure of 1 mm. of mercury for 1.5 hours and then reduced, in the reactor, in a stream of hydrogen at 455° C., 600 p. s. i. for 1 hour. The reactor was then charged with 87 g. of benzene, 3 g. of triethyl aluminum and 77 g. of propylene. The reactor contents were agitated and heated to 104° C. for 24 hours, the maximum pressure being 440 p. s. i. The reaction yielded 10 g. of liquid polymers of propylene and 15 g. of a solid polymer of propylene having a specific viscosity $\times 10^5$ of 16,400.

*Example 4*

The process of Example 1 is repeated, but the triethyl aluminum is replaced by its molar equivalent of triphenyl aluminum. The polyethylene product is worked up as in Example 1.

The high molecular weight, extremely high density polymers of our invention have high tensile and impact strengths and minimal capacity to absorb odors, flavors and various solvents. They open a new field of uses for polyethylenes, polypropylenes, etc. in many attractive applications, such as in carboys or other packaging means, plastic pipe, etc.

The polymers produced by the process of this invention can be subjected to such after-treatment as may be desired to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, gas barriers, binders, etc. to even a wider extent than polyethylenes made by prior processes.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes, such as paraffin or petrolatum waxes, with ester waxes, with high molecular weight polybutylenes, and with other organic materials. Small proportions between about .01 and about 1 percent of the various polymers produced by the process of the present invention can be dissolved or dispersed in hydrocarbon lubricating oils to increase V. I. and to decrease oil consumption when the compounded oils are employed in motors. The polymerization products having molecular weights of 50,000 or more, provided by the present invention, can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride or mixtures of chlorine and sulfur dioxide, sulfonation, and other reactions to which hydrocarbons may be subjected. The polymers of our invention can also be irradiated by high energy X-rays (about 0.5 to 2.5 m. e. v. or more) or by radioactive materials to effect cross-linking, increases in softening temperature, etc.

Having thus described our invention, what we claim is:

1. In a polymerization process for the production of a normally solid resin, the steps of contacting (1) a solution comprising a substantially inert hydrocarbon reaction medium and a charging stock comprising a monoolefinic hydrocarbon having 2 to 4 carbon atoms, inclusive, per molecule and, in said solution, a cocatalyst having the formula $AlR_3$, wherein R is a monovalent hydrocarbon radical, with (2) a heterogeneous catalyst comprising a minor proportion of a group 6a metal oxide extended upon a major proportion of a solid, inert supporting material; effecting said contacting under polymerization conditions including a suitable temperature in the range of about 50° C. to about 230° C. and superatmospheric pressure; recovering a normally solid resin thus produced.

2. The process of claim 1 wherein said oxide catalyst is partially pre-reduced before use.

3. The process of claim 1 wherein said oxide is a chromium oxide.

4. The process of claim 1 wherein said oxide is a molybdenum oxide.

5. The process of claim 1 wherein said oxide is a tungsten oxide.

6. A catalytic composition comprising essentially an oxide of a metal of group 6a of the periodic table extended upon a surface coating of alumina on aluminum.

7. A process for the polymerization of a charging stock comprising essentially at least one monoolefinic hydrocarbon having 2 to 4 carbon atoms, inclusive, per molecule to produce a high molecular weight resin, which process comprises contacting said charging stock with a catalyst comprising a minor proportion of an oxide of a metal of group 6a extended upon a major proportion of an inert, solid supporting material and with a cocatalyst which is a trihydrocarbon aluminum, each catalyst component being present in an operative proportion of at least about 0.001% by weight, based on the weight of said monoolefinic hydrocarbon, effecting said contacting under superatmospheric pressure at a suitable polymerization temperature between about 50° C. and about 230° C. and recovering said resin so produced.

8. The process of claim 7 wherein said monoolefinic hydrocarbon is ethylene.

9. The process of claim 7 wherein said monoolefinic hydrocarbon is propylene.

10. The process of claim 7 wherein said charging stock comprises a mixture of at least two monoolefinic hydrocarbons having 2 to 4 carbon atoms, inclusive, per molecule.

11. The process of claim 1 wherein said catalyst is calcined before use.

12. The process of claim 1 wherein said oxide is a molybdenum oxide and said monoolefinic hydrocarbon is ethylene.

13. The process of claim 1 wherein said monoolefinic hydrocarbon is propylene.

14. The process of claim 1 wherein said monoolefinic charging stock is a mixture of monoolefinic hydrocarbons.

References Cited in the file of this patent

UNITED STATES PATENTS

| | | |
|---|---|---|
| 2,699,457 | Ziegler | Jan. 11, 1955 |
| 2,727,024 | Field et al. | Dec. 13, 1955 |